United States Patent [19]
Moon

[11] Patent Number: 5,918,742
[45] Date of Patent: Jul. 6, 1999

[54] HOLIDAY TREAT PACKAGE WITH MAGNETICALLY CHARGED PARTICLES

[76] Inventor: Flora Rose Moon, 1120 Woodland Dr., Clinton, Iowa 52732

[21] Appl. No.: 08/899,487

[22] Filed: Jul. 19, 1997

[51] Int. Cl.$^6$ .............................. B65D 85/00; B65D 65/22
[52] U.S. Cl. ........................ 206/459.5; 220/8; 229/87.01; 229/87.06; 229/87.08; 426/104; 428/7
[58] Field of Search .............................. 229/87.01, 87.02, 229/87.05, 87.06, 87.08; 206/445, 459.1, 459.5; 220/8, 4.21, 4.24; 426/104, 132; 428/7, 15

[56] References Cited

U.S. PATENT DOCUMENTS

| | | | |
|---|---|---|---|
| Re. 25,143 | 3/1962 | Engleson et al. ..................... | 229/87.05 |
| 286,654 | 10/1883 | Tobias ................................. | 229/87.01 |
| 2,071,232 | 2/1937 | Langehennig ........................ | 229/87.01 |
| 2,118,262 | 5/1938 | McGrady et al. .................... | 229/87.06 |
| 2,284,668 | 6/1942 | Martin . | |
| 2,924,579 | 2/1960 | Renner ................................ | 426/104 X |
| 3,756,497 | 9/1973 | Stewart . | |
| 4,170,305 | 10/1979 | Hull et al. . | |
| 4,384,644 | 5/1983 | Uchida . | |
| 4,596,340 | 6/1986 | Luter .................................. | 220/8 |
| 5,332,605 | 7/1994 | Delamer ............................. | 428/15 |
| 5,545,069 | 8/1996 | Glynn et al. ........................ | 426/104 X |

*Primary Examiner*—Bryon P. Gehman
*Attorney, Agent, or Firm*—Michael I. Kroll

[57] ABSTRACT

A holiday treat package (16) comprising a tubular container (18) filled with a plurality of candy and small toys (20). A wrapper (22) has first and second longitudinal edges (24) of a length longer than the axial length of the tubular container (18). It also has first and second transverse edges (26) of a width longer than the radial circumference of the tubular container (18), so that the wrapper (22) can be rolled about the tubular container (18). A facility (28) is for sealing off the transverse edge (26) of the wrapper (22) after the wrapper (22) is rolled about the tubular container (18). A component (30) is for retaining one of the longitudinal edges (24) to the wrapper (22) after the wrapper (22) is rolled about the tubular container (18) so that it can be given to a child.

15 Claims, 5 Drawing Sheets

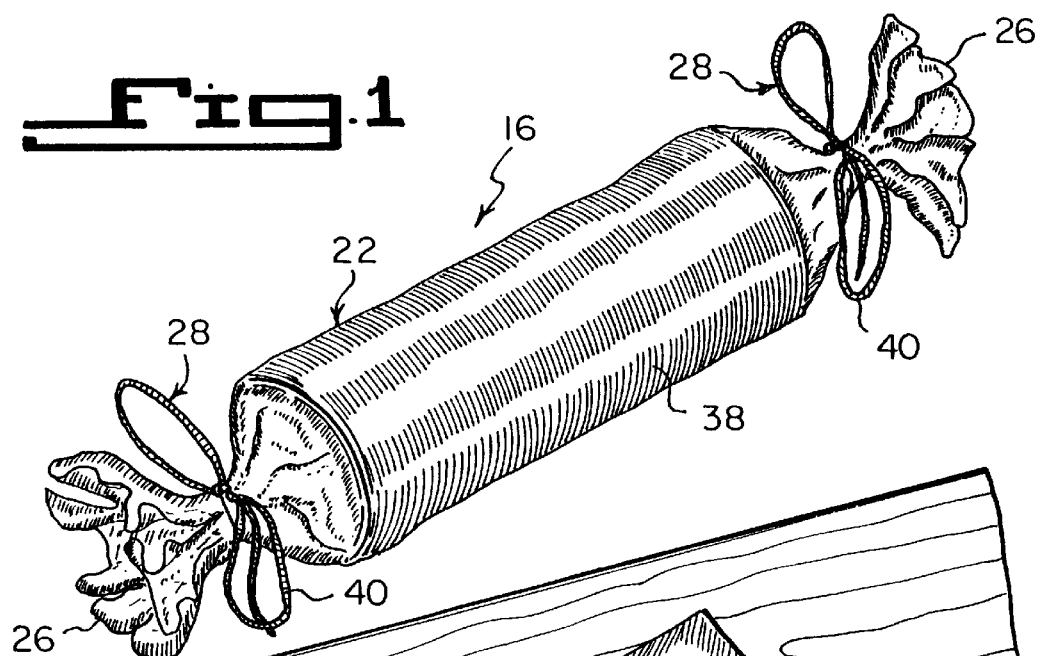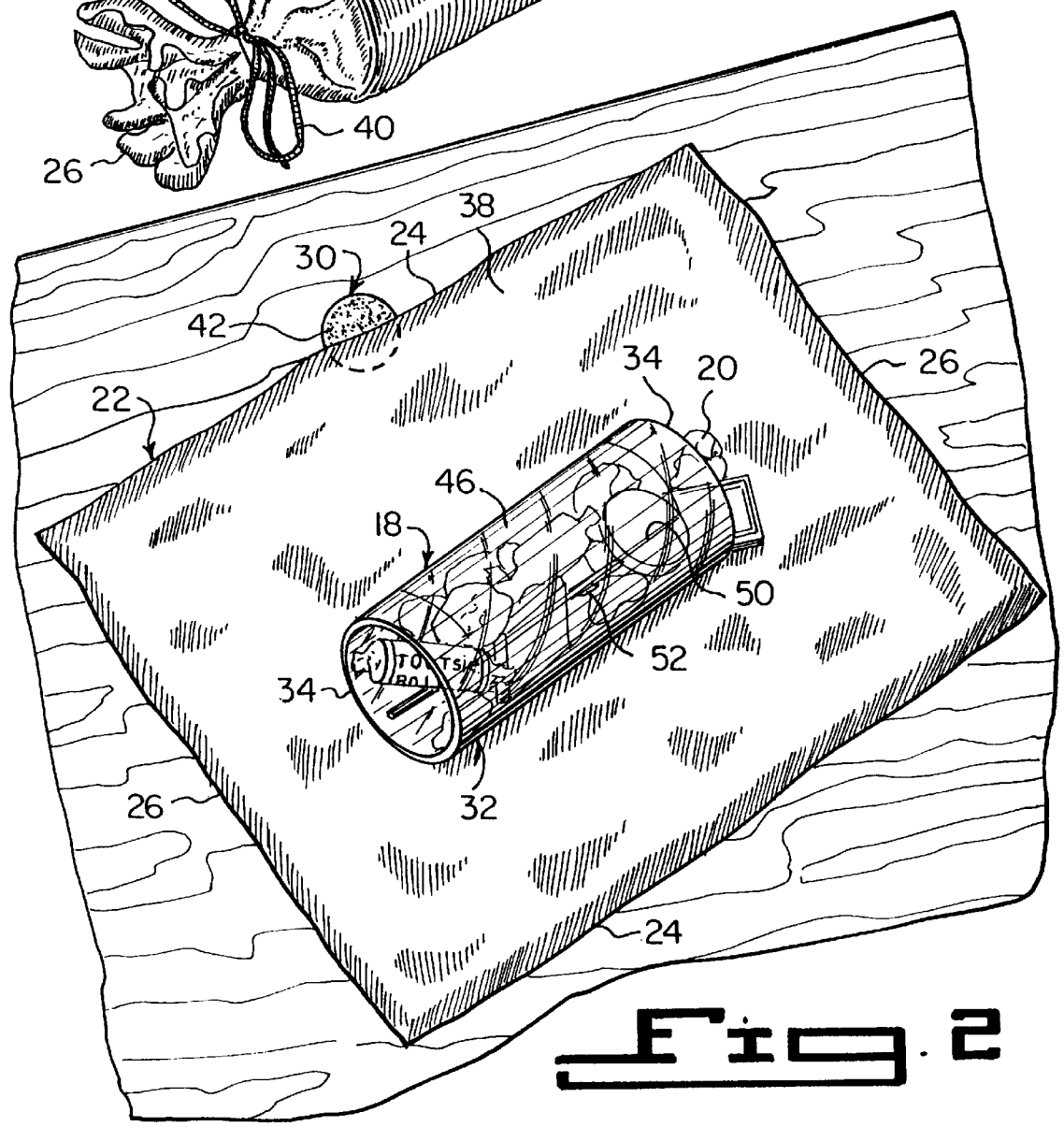

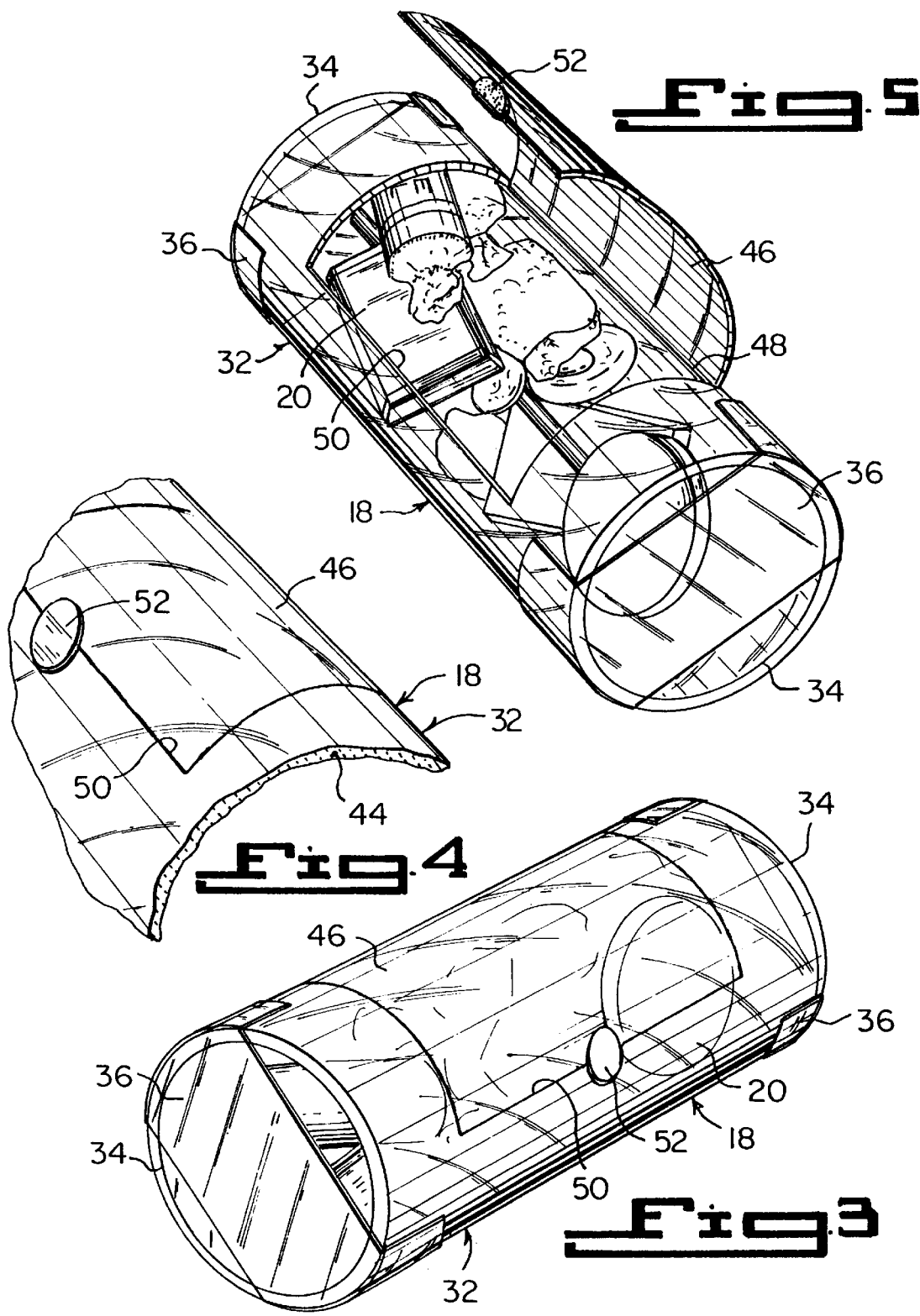

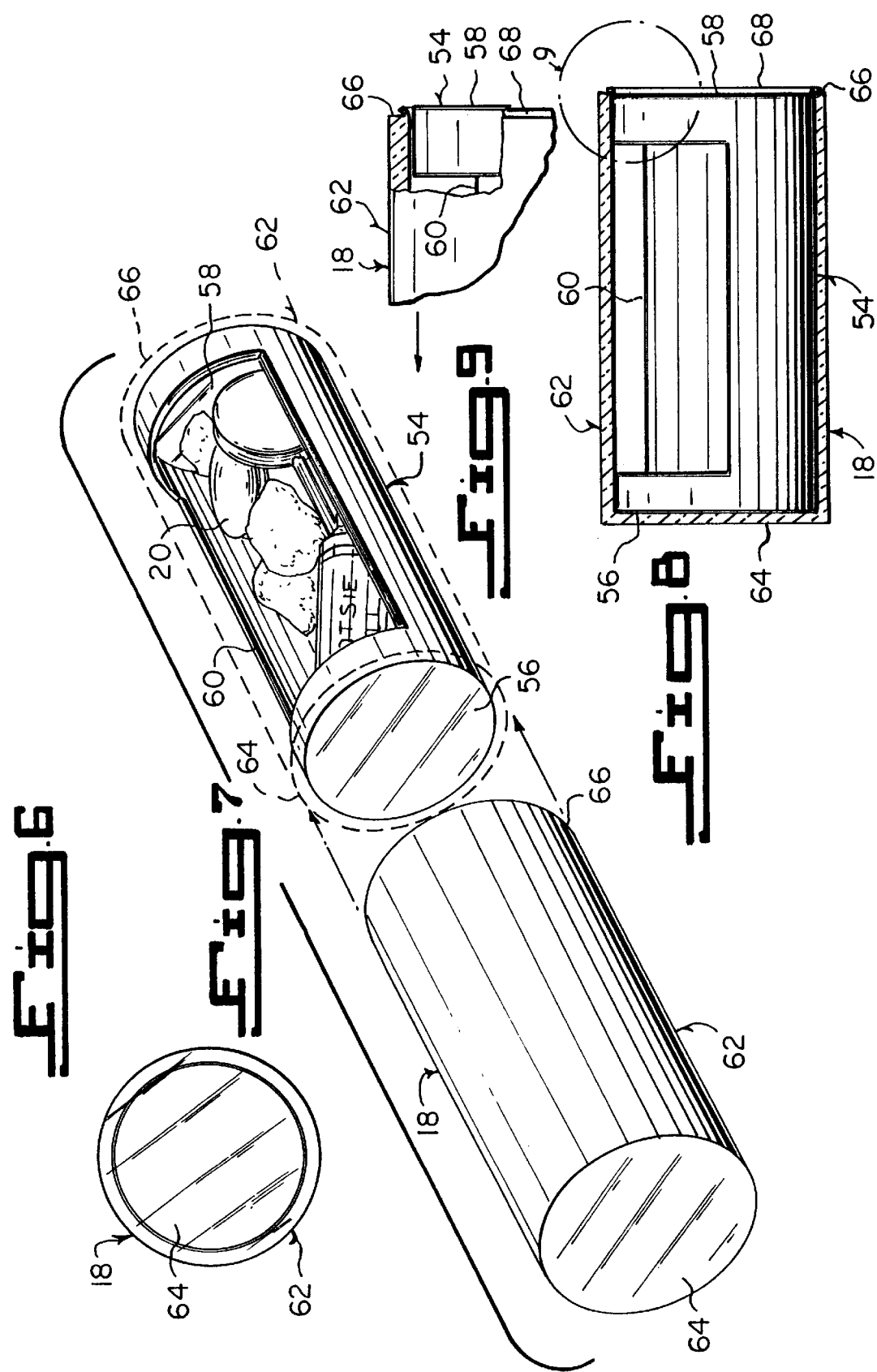

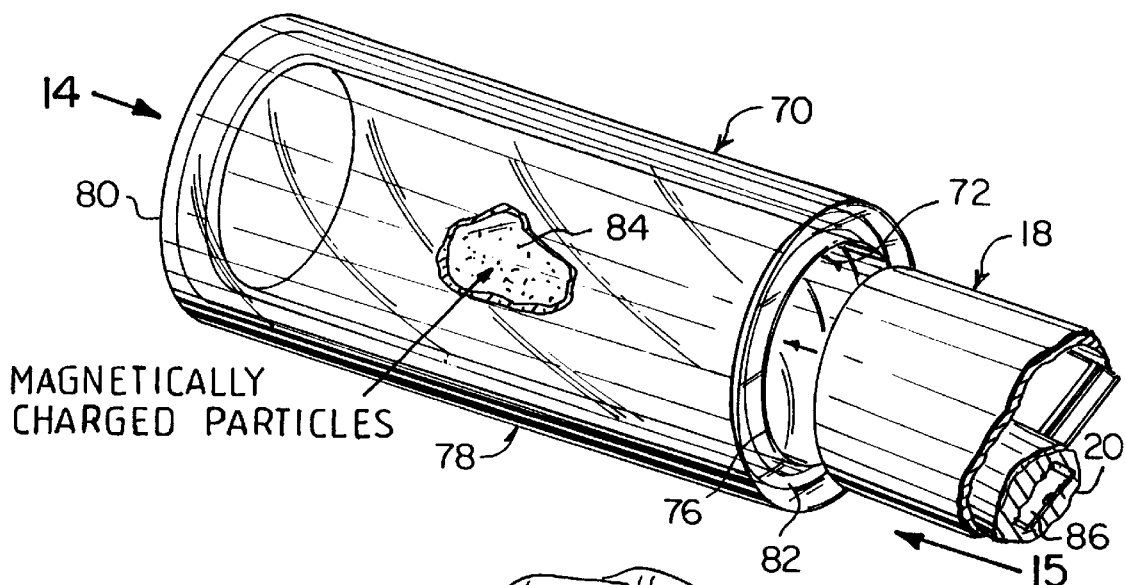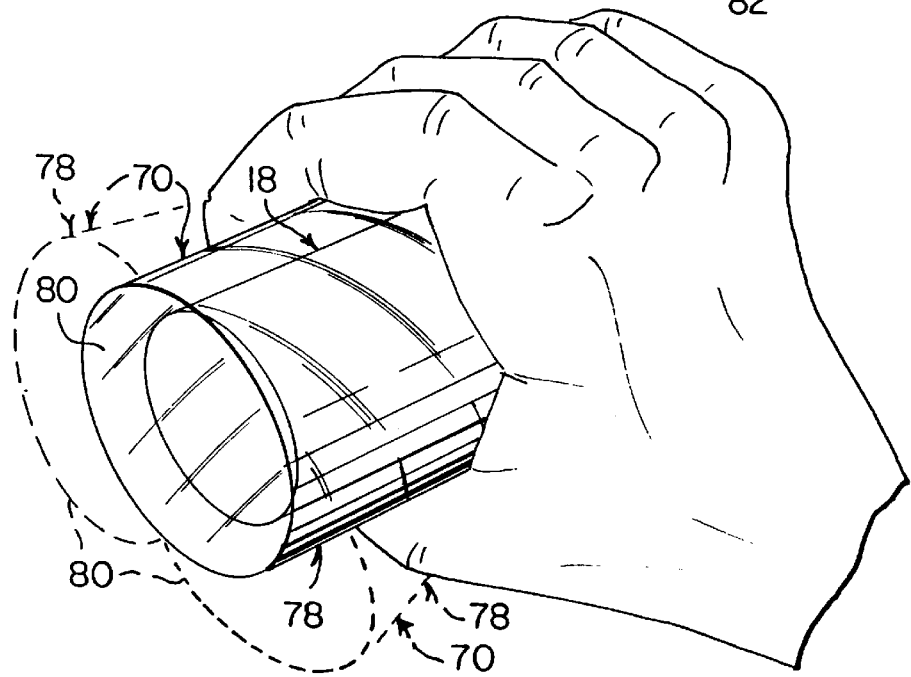

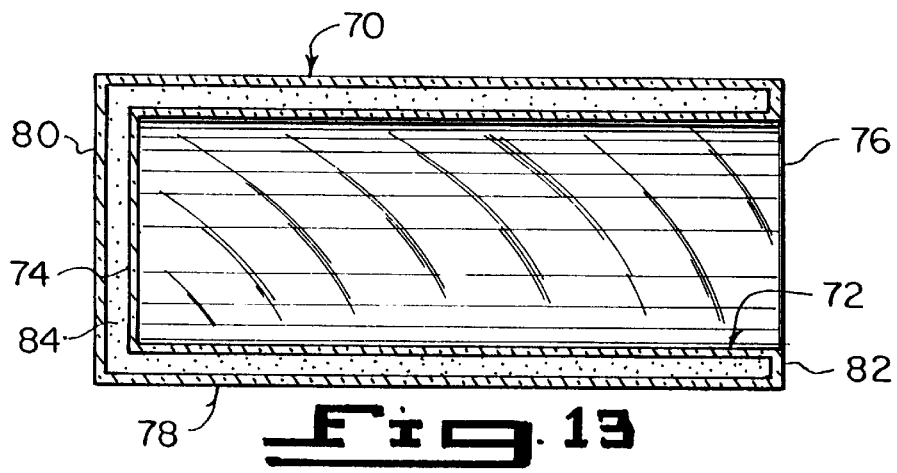
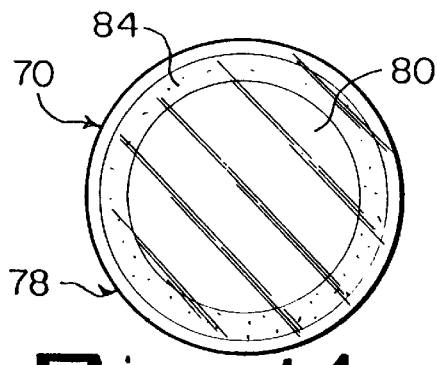
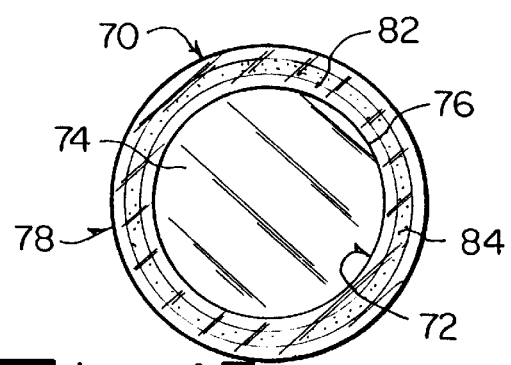
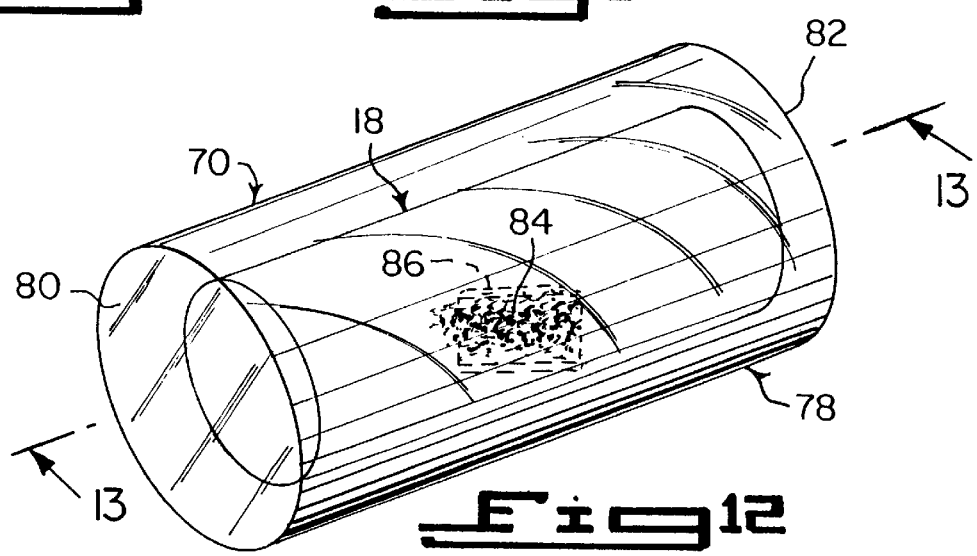
(CONCENTRATION OF MAGNETICALLY CHARGED PARTICLES INDICATES PRESENCE OF METAL OBJECT)

HOLIDAY TREAT PACKAGE WITH MAGNETICALLY CHARGED PARTICLES

BACKGROUND OF THE INVENTION

1. Field of the Invention

The instant invention relates generally to containers and more specifically it relates to a holiday treat package. The holiday treat package consists of a tubular container for storing candy and small toys that are wrapped with a piece of decorative paper, so that it can be given to a child.

2. Description of the Prior Art

Numerous containers have been provided in prior art. For example, U.S. Pat. No. 2,284,668 to Martin; U.S. Pat. No. 3,756,497 to Stewart; U.S. Pat. No. 4,170,305 to Hull, Jr. et al. and U.S. Pat. No. 4,384,644 to Uchida all are illustrative of such prior art. While these units may be suitable for the particular purpose to which they address, they would not be as suitable for the purposes of the present invention as heretofore described.

MARTIN, WILLIAM T.

PACKAGE

U.S. Pat. No. 2,284,668

In a package, a wrapper of waxed paper wrapped about the cylindrical surface of an article with its ends tucked in over the ends of the article. A lining of unwaxed paper is secured to the inner side of the waxed paper and extends about the cylindrical surface of the article. A wrapper of foil encloses the waxed paper wrapper with its ends tucked in over the tucked in ends thereof. A tearing strip is secured between the waxed paper wrapper and the lining and extends in loop form about the cylindrical surface of the article. Its end portions are arranged beneath one of the tucked in ends of the waxed paper wrapper. One of the ends project out from one of the tucks of the waxed paper wrapper and outside of the foil wrapper.

STEWART, JAMES EDWARD

MAILING TUBE

U.S. Pat. No. 3,756,497

A foldable shipping container or mailing tube has a substantially triangular cross-section. At least one of the end panels of the container is hingeably connected to one of the side panels thereof, and is insertable into the open end of the assembled container with a pair of side flaps having indents formed therein, which cooperate with an over-center acting locking tab formed in the other two side panels of the container and which locks the end panel into place by cooperative interference with the edges of the indents formed in the side flaps of the end panel.

HULL JR., RAYMOND J.

HOPPES, WILLIAM F.

EASY-OPEN WRAPPER FOR CYLINDRICAL PRODUCTS

U.S. Pat. No. 4,170,305

A wrapped cylindrical body such as a catamenial tampon is provided with a wrapper which will maintain the body clean and dust and moisture proof and can easily be opened. Specifically, the cylindrical body is wrapped in a wrapper having perforations arranged in a pattern whereby almost the entire wrapper can be removed in one motion without the need for pulling substantial quantities of wrapping from the ends of the cylindrical body. Further, the wrapper provides no open path for dust and other contaminants to reach the wrapped product. These advantages are achieved by providing two perforated zones in the wrapping material, double wrapping the cylindrical body and having the perforations of each of the zones offset, so as to close any path into the product. The zones are located so as to over tie each other when the product is wrapped and are adhered together whereby essentially the entire product may be unwrapped in a single unwrapping operation.

UCHIDA, ISAMU

ROLL OF COIN WRAPPING PAPER

U.S. Pat. No. 4,384,644

A roll of coin wrapping paper includes streak portions which extend in the width direction of the paper and are arrange at a predetermined pitch in the longitudinal direction of the paper. The streak portions are formed by making such portions thicker than the other portions of the paper. The thicker portion is made by applying printing ink to the paper. Alternatively, the streak portion may be formed by making a series of perforations in the paper.

SUMMARY OF THE INVENTION

A primary object of the present invention is to provide a holiday treat package that will overcome the shortcomings of the prior art devices.

Another object is to provide a holiday treat package in which candy and small toys can be stored within a tubular container that is wrapped with a piece of decorative paper, so that it can be given to a child.

An additional object is to provide holiday treat package that can be used in conjunction with a metal detecting device to determine if any of the candy has been tampered with by indicating if the presence of a metal object was inserted into the candy.

A further object is to provide holiday treat package that is simple and easy to use.

A still further object is to provide holiday treat package that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of a first embodiment of the instant invention completely assembled.

FIG. 2 is a perspective view of a first embodiment before the decorative piece of paper is wrapped about the tubular container filled with candy and small toys.

FIG. 3 is a perspective view of the tubular container filled with candy and small toys, sealed at both ends with transparent adhesive tape.

FIG. 4 is a perspective view of a portion of the tubular container taken in the direction of arrow 4 in FIG. 3.

FIG. 5 is a perspective view of the tubular container similar to FIG. 3 taken from an opposite side with the side access door opened.

FIG. 6 is an end view of a tubular container of a second embodiment.

FIG. 7 is a perspective view of the tubular container of the second embodiment, showing the outer sleeve ready to be installed upon the inner sleeve.

FIG. 8 is a side view partly in cross section, showing the outer sleeve installed upon the inner sleeve of the tubular container of the second embodiment.

FIG. 9 is an enlarged side view of a portion of FIG. 8 as indicated by arrow 9 in FIG. 8, showing the outer sleeve being removed from the inner sleeve.

FIG. 10 is a perspective view with parts broken away and in section, showing the tubular container ready to be inserted into a metal detection device.

FIG. 11 is a perspective view showing the metal detection device with the tubular container being agitated.

FIG. 12 is a perspective view similar to FIG. 11, showing a concentration of magnetically charged particles to indicate the presence of a metal object within a piece of candy in the tubular container.

FIG. 13 is a cross sectional view of the metal detection device taken along line 13—13 in FIG. 12.

FIG. 14 is an end view taken in the direction of arrow 14 in FIG. 10.

FIG. 15 is an end view taken in the direction of arrow 15 in FIG. 10.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 15 illustrate a holiday treat package 16 of the present invention. With regard to the reference numerals used, the following numbering is used throughout the various drawing figures.

16 holiday treat package
18 tubular container of 16
20 candy in 18
22 wrapper of 16
24 longitudinal edge of 22
26 transverse edge of 22
28 sealing facility of 16
30 retaining component of 16
32 tube for 18
34 open end of 32
36 adhesive tape on 34
38 piece of paper for 22
40 piece of cord for 28
42 sticker for 30
44 transparent material for 32
46 side door of 32
48 hinge for 46
50 side access entrance in 32
52 adhesive tab on 46
54 inner cylindrical sleeve of 18
56 sealed end of 54
58 sealed end of 54
60 side access entrance in 54
62 outer cylindrical sleeve of 18
64 sealed end of 62
66 open end of 62
68 flexible annular lip on 66
70 metal detection device for 16
72 inner cylindrical hollow transparent member of 70
74 sealed end of 72
76 open end of 72
78 outer cylindrical hollow transparent member of 70
80 sealed end of 80
82 annular sealed end of 80
84 magnetically charged particles in 70
86 metal object in 20

The holiday treat package 16 comprises a tubular container 18 filled with a plurality of candy 20 and small toys. A wrapper 22 has first and second longitudinal edges 24 of a length longer than the axial length of the tubular container 18. It also has first and second transverse edges 26 of a width longer than the radial circumference of the tubular container 18, so that the wrapper 22 can be rolled about the tubular container 18. A facility 28 is for sealing off the transverse edges 26 of the wrapper 22, after the wrapper 22 is rolled about the tubular container 18. A component 30 is for retaining one of the longitudinal edges 24 to the wrapper 22, after the wrapper 22 is rolled about the tubular container 18 so that it can be given to a child.

The tubular container 18, as shown in FIGS. 2 through 5, is a tube 32 having open ends 34, so that the candy 20 and small toy can be inserted therein. Two pieces of adhesive tape 36 seal off the open ends 34 of the tube 32, after the candy 20 and small toy are inserted.

The wrapper 22 is a piece of paper 38. It may have a holiday decoration thereon, such as for Halloween, Christmas and even for a birthday. The sealing facility 28 includes two pieces of cord 40. Each piece of cord 40 will tie off one transverse edge 26 of the wrapper 22. The retaining component 30 is a sticker 42. The sticker 42 may also have a holiday decoration thereon.

The tube 32 is fabricated out of a transparent material 44, so that the candy 20 and toy can be seen therein. The tube 32 includes a side door 46 integrally formed therein with a hinge 48 along one edge. When the side door 46 is opened a side access entrance 50 can be utilized to remove the candy 20 and small toy therefrom. An adhesive tab 52 is attached to an edge of the side door 46 opposite from the hinge 48, so that the adhesive tab 52 will keep the side door 46 closed.

FIGS. 6 through 9 show another type of tubular container 18, which consists of an inner cylindrical sleeve 54 sealed at both ends 56, 58 and has a side access entrance 60 that can be utilized to insert and remove the candy 20 and small toy. An outer cylindrical sleeve 62 is sealed at one end 64 and opened at an opposite end 66. The outer cylindrical sleeve 62 can slide onto the inner cylindrical sleeve 54. A flexible annular lip 78 is formed about the open end 66 of the outer cylindrical sleeve 62. The flexible annular lip 78 will retain the inner cylindrical sleeve 54 within the outer cylindrical sleeve 62.

A metal detection device 70 is shown in FIGS. 10 through 15, and containers an inner cylindrical hollow transparent member 72 sealed at one end 74 and open at an opposite end 76. An outer cylindrical hollow transparent member 78 is sealed at one end 80 and annularly sealed at an opposite end 82 to the open end 76 of the inner cylindrical hollow transparent member 72. the outer cylindrical hollow transparent member 78 is slightly larger in diameter than the inner cylindrical hollow transparent member 72, so that a space is formed between the sides and sealed ends thereof.

Magnetically charged particles 84 are carried within the space between the inner cylindrical hollow transparent member 72 and the outer cylindrical hollow transparent member 78. When the tubular container 18 is inserted within the metal detection device 70 and agitated, the magnetically charged particles 84 may concentrate at a location to indicate the presence of a metal object 86, within the candy 20 if the candy 20 is tampered with. The metal object 86 could be a razor blade, nail or other sharp article to hurt the child.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A holiday treat package comprising:
  a) a tubular container filled with a pluraltiy of candy and small toys; and
  b) a wrapper having first and second longitudinal edges of a length longer than the axial length of said tubular container and having first and second transverse edges of a width longer than the radial circumference of said tubular container, so that said wrapper can be rolled about said tubular container;
  c) means for sealing off said transverse edges of said wrapper after said wrapper is rolled about said tubular container;
  d) means for retaining one of said longitudinal edges of said wrapper after said wrapper is rolled about said tubular container so that it can be given to a child; and
  e) a metal detection device including:
    i) an inner cylindrical hollow transparent member sealed at one end and open at an opposite end;
    ii) an outer cylindrical hollow transparent member sealed at one end and annularly sealed at an opposite end to said open end of said inner cylindrical hollow transparent member, said outer cylindrical hollow transparent member slightly larger in diameter than said inner cylindrical hollow transparent member, so that a space is formed between the sides and sealed ends thereof; and
    iii) magnetically charged particles carried within said space between said inner cylindrical hollow transparent member and said outer cylindrical hollow transparent member, so that when said tubular container is inserted within said metal detection device and agitated, said magnetically charged particles may concentrate at a location to indicate the presence of a metal object within the candy.

2. A holiday treat package as recited in claim 1, wherein said tubular container is a tube having open ends, so that the candy and small toys can be inserted therein.

3. A holiday treat package as recited in claim 2, further including two pieces of adhesive tape to seal off said open ends of said tube after the candy and small toys are inserted.

4. A holiday treat package as recited in claim 2, wherein said tube is fabricated out of a transparent material, so that the candy and toys can be seen therein.

5. A holiday treat package as recited in claim 2, wherein said tube includes:
  a) a side door integrally formed therein with a hinge along one edge, so that when said side door is opened a side access entrance can be utilized to remove the candy and small toys therefrom; and
  b) an adhesive tab attached to an edge of said side door opposite from said hinge, so that said adhesive tab will keep said side door closed.

6. A holiday treat package as recited in claim 1, wherein said wrapper is a piece of paper.

7. A holiday treat package as recited in claim 1, wherein said sealing means includes two pieces of cord, wherein each said piece of cord will tie off one said transverse edge of said wrapper.

8. A holiday treat package as recited in claim 1, wherein said retaining means is a sticker.

9. A holiday treat package as recited in claim 1, wherein said tubular container includes:
  a) an inner cylindrical sleeve sealed at both ends and having a side access entrance that can be utilized to insert and remove the candy and small toys;
  b) an outer cylindrical sleeve sealed at one end and open at an opposite end, so that said outer cylindrical sleeve can slide onto said inner cylindrical sleeve; and
  c) a flexible annular lip formed about said open end of said outer cylindrical sleeve, so that said flexible annular lip will retain said inner cylindrical sleeve within said outer cylindrical sleeve.

10. A holiday treat package comprising:
  a) a tubular container filled with a pluraltiy of candy and small toys; and
  b) a wrapper being a piece of paper having first and second longitudinal edges of a length longer than the axial length of said tubular container and having first and second transverse edges of a width longer than the radial circumference of said tubular container, so that said wrapper can be rolled about said tubular container;
  c) means for sealing off said transverse edges of said wrapper after said wrapper is rolled about said tubular container, wherein said sealing means includes two pieces of cord, wherein each said piece of cord will tie off one said transverse edge of said wrapper;
  d) means for retaining one of said longitudinal edges of said wrapper after said wrapper is rolled about said tubular container so that it can be given to a child; and
  e) a metal detection device including:

i) an inner cylindrical hollow transparent member sealed at one end and open at an opposite end;

ii) an outer cylindrical hollow transparent member sealed at one end and annularly sealed at an opposite end to said open end of said inner cylindrical hollow transparent member, said outer cylindrical hollow transparent member slightly larger in diameter than said inner cylindrical hollow transparent member, so that a space is formed between the sides and sealed ends thereof; and iii) magnetically charged particles carried within said space between said inner cylindrical hollow transparent member and said outer cylindrical hollow transparent member, so that when said tubular container is inserted within said metal detection device and agitated, said magnetically charged particles may concentrate at a location to indicate the presence of a metal object within the candy.

11. A holiday treat package as recited in claim 10, wherein said tubular container is a tube having open ends, so that the candy and small toys can be inserted therein.

12. A holiday treat package as recited in claim 11, further including two pieces of adhesive tape to seal off said open ends of said tube after the candy and small toys are inserted.

13. A holiday treat package as recited in claim 12, wherein said tube is fabricated out of a transparent material, so that the candy and toys can be seen therein.

14. A holiday treat package as recited in claim 13, wherein said tube includes:

a) a side door integrally formed therein with a hinge along one edge, so that when said side door is opened a side access entrance can be utilized to remove the candy and small toys therefrom; and b) an adhesive tab attached to an edge of said side door opposite from said hinge, so that said adhesive tab will keep said side door closed.

15. A holiday treat package as recited in claim 10, wherein said tubular container includes:

a) an inner cylindrical sleeve sealed at both ends and having a side access entrance that can be utilized to insert and remove the candy and small toys;

b) an outer cylindrical sleeve sealed at one end and open at an opposite end, so that said outer cylindrical sleeve can slide onto said inner cylindrical sleeve; and c) a flexible annular lip formed about said open end of said outer cylindrical sleeve, so that said flexible annular lip will retain said inner cylindrical sleeve within said outer cylindrical sleeve.

* * * * *